US008533720B2

(12) United States Patent
Byrum et al.

(10) Patent No.: US 8,533,720 B2
(45) Date of Patent: Sep. 10, 2013

(54) OFFLOADING WORK FROM ONE TYPE TO ANOTHER TYPE OF PROCESSOR BASED ON THE COUNT OF EACH TYPE OF SERVICE CALL INSTRUCTIONS IN THE WORK UNIT

(75) Inventors: Wilton T. Byrum, San Jose, CA (US); Christopher Cook, San Jose, CA (US); Thomas A. Thackrey, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 197 days.

(21) Appl. No.: 13/034,775

(22) Filed: Feb. 25, 2011

(65) Prior Publication Data
US 2012/0222033 A1     Aug. 30, 2012

(51) Int. Cl.
*G06F 9/455*     (2006.01)
*G06F 9/46*     (2006.01)

(52) U.S. Cl.
USPC .............................. 718/102; 718/1; 718/105

(58) Field of Classification Search
None
See application file for complete search history.

(56) References Cited

U.S. PATENT DOCUMENTS

| | | | |
|---|---|---|---|
| 4,394,727 A | 7/1983 | Hoffman et al. |
| 5,126,932 A | 6/1992 | Wolfson et al. |
| 5,301,324 A | 4/1994 | Dewey et al. |
| 5,303,369 A | 4/1994 | Borcherding et al. |
| 5,437,032 A | 7/1995 | Wolf et al. |
| 5,701,482 A | 12/1997 | Harrison et al. |
| 5,748,468 A | 5/1998 | Notenboom et al. |
| 5,793,982 A | 8/1998 | Shrader et al. |
| 5,881,238 A | 3/1999 | Aman et al. |
| 6,085,217 A | 7/2000 | Ault et al. |
| 6,370,599 B1 | 4/2002 | Anand et al. |
| 6,496,823 B2 | 12/2002 | Blank et al. |
| 6,591,262 B1 | 7/2003 | MacLellan et al. |
| 6,742,006 B2 | 5/2004 | Raduchel et al. |
| 6,898,673 B2 | 5/2005 | Gruner et al. |

(Continued)

FOREIGN PATENT DOCUMENTS
WO     WO0161470 A2     8/2001

OTHER PUBLICATIONS

Putnikovic, Branimir, Soran Skocir, "Database Migration Using Standard Data Unload and Load Procedures on z/OS Platform," 9th International Conference on Telecommunications, Jun. 13-15, 2007, pp. 259-266.

(Continued)

*Primary Examiner* — Abdullah Al Kawsar
*Assistant Examiner* — Bradley Teets
(74) *Attorney, Agent, or Firm* — Steven Chiu, Esq.; Blanche E. Schiller, Esq.; Heslin Rothenberg Farley & Mesiti P.C.

(57) ABSTRACT

A work unit (e.g., a load module) to be executed on one processor may be eligible to be offloaded and executed on another processor that is heterogeneous from the one processor. The other processor is heterogeneous in that is has a different computing architecture and/or different instruction set from the one processor. A determination is made as to whether the work unit is eligible for offloading. The determination is based, for instance, on the particular type of instructions (e.g., particular type of service call and/or program call instructions) included in the work unit and whether those types of instructions are supported by the other processor. If the instructions of the work unit are supported by the other processor, then the work unit is eligible for offloading.

16 Claims, 5 Drawing Sheets

(56) References Cited

U.S. PATENT DOCUMENTS

| | | | |
|---|---|---|---|
| 6,901,488 B2 | 5/2005 | Gruner et al. | |
| 6,901,583 B1 | 5/2005 | Park | |
| 7,941,647 B2 * | 5/2011 | Yates et al. | 712/220 |
| 8,127,121 B2 * | 2/2012 | Yates et al. | 712/244 |
| 2004/0187126 A1 | 9/2004 | Yoshimura | |
| 2007/0226745 A1 | 9/2007 | Haas et al. | |
| 2007/0283349 A1 | 12/2007 | Creamer et al. | |
| 2008/0098208 A1 | 4/2008 | Reid et al. | |
| 2008/0189714 A1 * | 8/2008 | Ault et al. | 718/104 |
| 2008/0216073 A1 * | 9/2008 | Yates et al. | 718/100 |
| 2009/0012981 A1 | 1/2009 | Kogoh | |
| 2009/0089794 A1 | 4/2009 | Hilton | |
| 2009/0313633 A1 | 12/2009 | Nardelli et al. | |
| 2011/0289519 A1 * | 11/2011 | Frost | 719/328 |
| 2012/0144167 A1 * | 6/2012 | Yates et al. | 712/216 |
| 2012/0192191 A1 * | 7/2012 | Jellinek et al. | 718/102 |
| 2012/0222033 A1 | 8/2012 | Byrum et al. | |

OTHER PUBLICATIONS

Huerta-Canepa, G. Dongman Lee, "An Adaptable Application Offloading Scheme Based on Application Behavior," 22nd International Conference on Advanced Information Networking and Applications, Mar. 25-28, 2008, pp. 387-392 (Abstract Only).

z/Architecture—Principles of Operation, IBM Publication No. SA22-7832-08, 9th Edition, Aug. 2010, pp. 1-1496.

Office Action for U.S. Appl. No. 13/014,123 dated Oct. 4, 2012.

* cited by examiner

OFFLOADING WORK FROM ONE TYPE TO ANOTHER TYPE OF PROCESSOR BASED ON THE COUNT OF EACH TYPE OF SERVICE CALL INSTRUCTIONS IN THE WORK UNIT

BACKGROUND

This invention relates, in general, to processing of units of work (i.e., work units), and in particular, to determining whether particular work units may be moved from one type of processor to another type of processor for processing.

Typically, work units of a particular computing platform (e.g., a particular architecture and/or having a particular instruction set) are executed on a processor of that platform. At times, however, it may be desirable or necessary to execute the work units on another processor of a different computing platform. In such a situation, the work units are made eligible for moving to the other processor by recompiling the source code of the work units to be moved making the work units compatible with the computing platform of the other processor.

BRIEF SUMMARY

In accordance with an aspect of the present invention, work units are offloaded from one processor to another processor without recompiling the source code of the work units. Instead, the work units are examined to determine whether resources needed by the work units are supported by the other processor making those work units eligible for offloading to the other processor.

The shortcomings of the prior art are overcome and additional advantages are provided through the provision of a computer program product for determining whether a work unit is eligible for offloading from one processor to another processor for processing. The computer program product comprises a storage medium readable by a processing circuit and storing instructions for execution by the processing circuit for performing a method. The method includes, for instance, examining the work unit for selected instructions, the selected instructions including at least one of one or more types of service call instructions or one or more types of program call instructions, wherein the work unit includes at least one selected instruction; determining whether the another processor supports the at least one selected instruction existing in the work unit; and providing an indication that the work unit is eligible for offloading, responsive to the determining indicating the another processor supports the at least one selected instruction.

Methods and systems relating to one or more aspects of the present invention are also described and claimed herein. Further, services relating to one or more aspects of the present invention are also described and may be claimed herein.

Additional features and advantages are realized through the techniques of the present invention. Other embodiments and aspects of the invention are described in detail herein and are considered a part of the claimed invention.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

In accordance with an aspect of the present invention, a capability is provided to determine whether a work unit (e.g., a load module) to be executed on one processor can be offloaded and processed on another processor that is heterogeneous from the one processor. The other processor, also referred to herein as an offload processor, is heterogeneous in that natively it has a different computing architecture and/or a different instruction set from the one processor. In one example, the determination of whether the work unit may be offloaded is based on the particular type of instructions included in the work unit and whether those types of instructions are supported by the other processor. In one particular example, a determination is made as to whether the work unit includes one or more types of service calls (SVCs) and/or one or more types of program calls (PCs), and whether those types of service calls and/or program calls existing within the work unit are supported by the other processor.

Figure 1A:
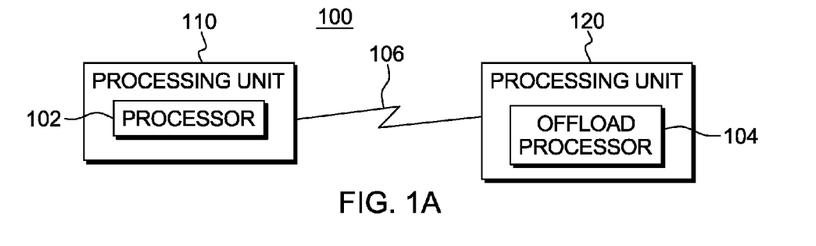
FIG. 1A depicts one example of a processing environment to incorporate and/or use one or more aspects of the present invention.

One embodiment of a processing environment to incorporate and use one or more aspects of the present invention is described with reference to FIG. 1A. In one example, a processing environment 100 includes a processor 102 coupled to another processor 104 via a connection 106, such as a channel-to-channel adapter or any other type of suitable connection. In this particular example, processor 102 is based on the Z/ARCHITECTURE® offered by International Business Machines Corporation. It executes an operating system, such as the Z/OS® operating system, and may be part of a processing unit 110 (e.g., a system or server, etc.), such as a Z/SERIES® or ZENTERPRISE™ server, offered by International Business Machines Corporation. Processing unit 110 includes, for example, one or more processors (e.g., one or more processors 102), memory and/or one or more input/output devices or interfaces coupled to one another via one or more buses. One embodiment of the Z/Architecture® is described in "z/Architecture—Principles of Operation," IBM Publication No. SA22-7832-08, $9^{th}$ Edition, August 2010. ZSERIES®, Z/OS®, and Z/ARCHITECTURE® are registered trademarks of International Business Machines Corporation, Armonk, N.Y. Other names used herein may be registered trademarks, trademarks or product names of International Business Machines Corporation or other companies.

Processor 104, also referred to as an offload processor, is based on an architecture different from the architecture of processor 102. In this one example, processor 104 is based on the x86 architecture offered by INTEL® Corporation, Santa Clara, Calif. It executes an operating system, such as the AIX® operating system, and may be part of a processing unit 120 (e.g., a system or server, etc.), such as a System x® server, offered by International Business Machines Corporation. INTEL® is a registered trademark of INTEL® Corporation, Santa Clara, Calif.; and AIX® and SYSTEM X® are registered trademarks of International Business Machines Corporation, Armonk, N.Y.

Figure 1B:
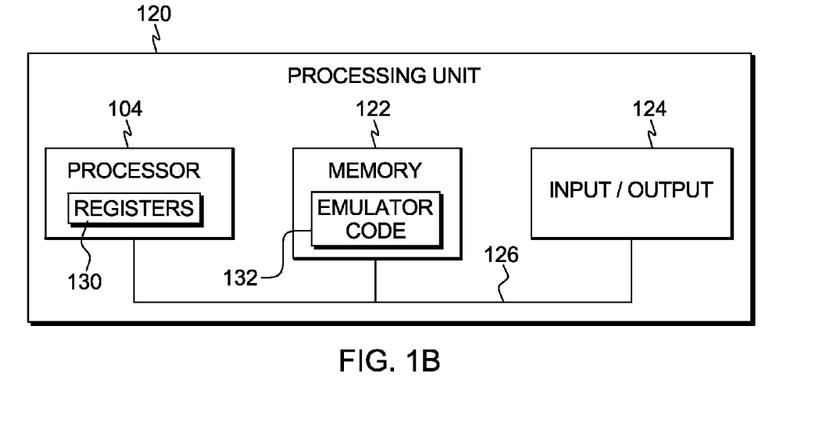
FIG. 1B depicts further details of a processing unit of FIG. 1A, in accordance with an aspect of the present invention.

As shown in FIG. 1B, in one example, processing unit 120 includes, for example, one or more processors (e.g., processor 104), memory 122 and/or one or more input/output devices or interfaces 124 coupled to one another via one or more buses 126. Processor 104 (a.k.a., a central processing unit) includes one or more registers 130, such as one or more general purpose registers and/or one or more special purpose registers, used during processing within the environment. These registers include information that represent the state of the environment at any particular point in time.

Moreover, processor 104 executes instructions and code that are stored in memory 122. In one particular example, the processor executes emulator code 132 stored in memory 122. This code enables the processing unit configured in one architecture to emulate another architecture. For instance, emulator code 132 allows processor 104, which is based on the x86 architecture, to emulate instructions native to the z/Architecture®.

Figure 1C:
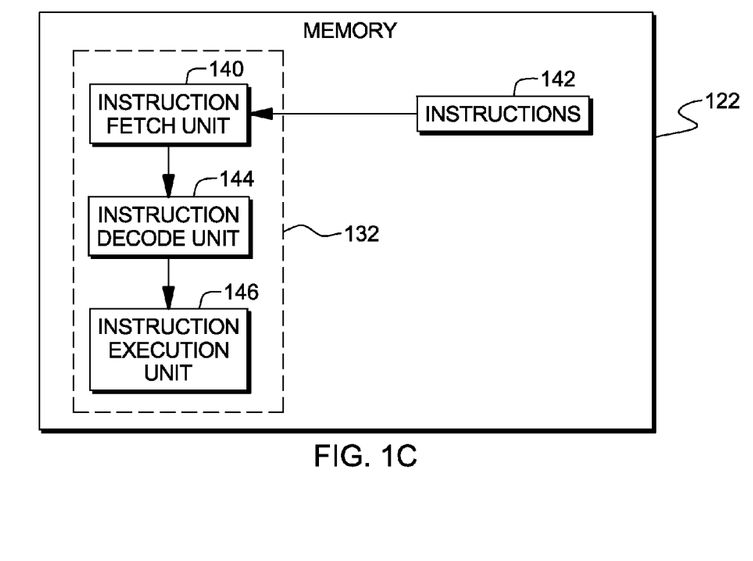
FIG. 1C depicts further details of memory of the processing unit of FIG. 1B, in accordance with an aspect of the present invention.

Further details relating to emulator code 132 are described with reference to FIG. 1C. In one example, emulator code 132 includes an instruction fetch unit 140 to fetch an instruction 142 from memory 122, and to optionally, provide local buffering for the fetched instruction; an instruction decode unit 144 to receive the instruction from the instruction fetch unit and to determine the type of instruction that has been fetched; and an instruction execution unit 146 to execute the instruction. Execution may include loading data into a register from memory 122; storing data back to memory from a register; or performing some type of arithmetic or logical operation, as determined by the decode unit. In one example, each unit is implemented in software, which is stored in memory and executed by the processor. In other examples, one or more of the units or operations are implemented in firmware, hardware, software or some combination thereof.

The instructions to be emulated, in accordance with an aspect of the present invention, are the one or more instructions of a work unit that was offloaded from processor 102 to processor 104. However, prior to a work unit being offloaded to another processor, a determination is made as to whether the work unit is eligible for offloading. In one example, this determination is based on the type of instructions included in the work unit to be processed. In the examples provided herein, the determination is based on whether the one or more types of service call instructions and/or one or more types of program call instructions in the work unit are supported by the offload processor. However, in other embodiments, the determination may be made using other criteria.

In one embodiment, the determination of eligibility is made prior to the work unit being ready for execution. For instance, it is made prior to the work unit being provided to a work dispatcher (i.e., the logic used to dispatch the work unit for execution). In a further embodiment, it is made at the time of dispatching. For instance, at the time the work unit is to begin executing, a determination is dynamically made as to whether it is eligible for offloading.

One embodiment of an overview of the logic to determine whether a work unit is eligible for offloading is described with reference to FIG. 2. This logic is performed by a processor, such as processor 102. In this example, the processor to make this determination is the processor having a same architecture (and/or instruction set) as the work unit being considered. In a further embodiment, however, another processor may make the determination.

Figure 2:
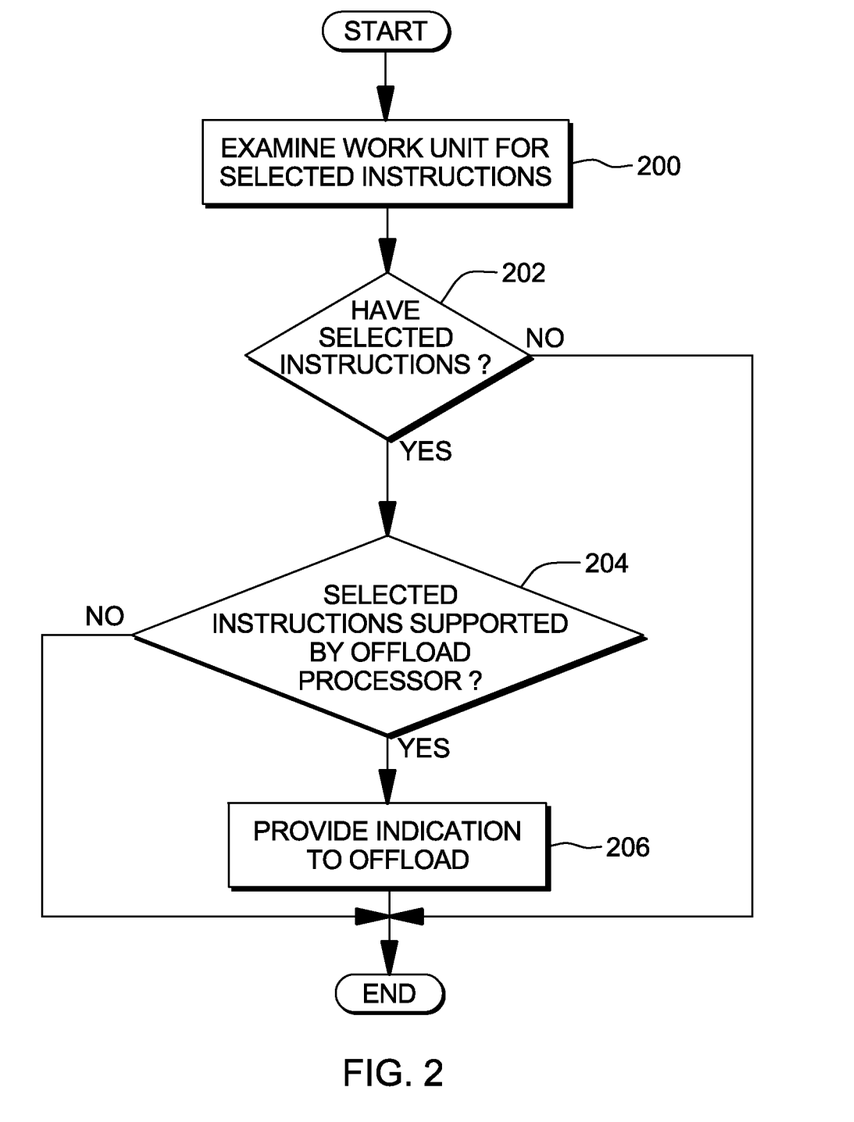
FIG. 2 depicts one embodiment of an overview of the logic to determine whether a work unit is eligible for processing by another type of processor, in accordance with an aspect of the present invention.

Referring to FIG. 2, initially, a work unit is examined for selected instructions, STEP 200. In this example, the work unit is examined to determine if it has one or more types of service call and/or or program call instructions. If it does not have any type of service call or program call instructions, INQUIRY 202, then the examination is complete, and, in this example, the work unit is considered not eligible for offloading to the other processor (i.e., the offload processor). An indication may be provided as such, and/or the work unit is not offloaded.

If it is determined that the work unit does have one or more types of service call or program call instructions, then a further determination is made as to whether the types of service call and/or program call instructions in the work unit are supported by the other processor, INQUIRY 204. If they are not supported, then examination is complete and the work unit is not eligible for offloading to the other processor. However, if the types of service call and program call instructions included in the work unit are supported by the other processor, then the work unit is eligible for offloading, and an indication as such is provided, STEP 206. As examples, this indication includes setting an indicator (e.g., flag, return code, etc.) specifying eligibility, and/or forwarding the work unit to the offload processor with or without setting the indicator.

Responsive to the work unit being eligible for offloading, processor 102 forwards the work unit over the connection to offload processor 104. Offload processor 104 then executes the instructions of the work unit. Since the instructions are of an architecture that is not native to the offload processor (e.g., z/Architecture®), which has an architecture or instruction set that differs from the architecture or instruction set of processor 102, the offloaded instructions are emulated by the offload processor and the results are provided to processor 102.

In accordance with one or more aspects of the present invention, the work units to be examined may be examined in report mode or interactive mode, as described herein. In report mode, a program executing on the reporting processor (i.e., the processor to examine the work units and report on selected instructions) reads one or more records from the work unit, searches for the selected instructions, updates counters, if the selected instructions are found, and provides a report of the counters, which is used to determine eligibility. For instance, in a particular example, the reporting processor may be the processor to determine eligibility, the processor to dispatch the work unit, or another processor.

In interactive or interrogatory mode, a user supplies the program executing on an examining processor (i.e., the processor to examine the work unit and determine eligibility) with a list of supported instructions, and if the work unit includes one or more selected instructions that are not supported by an offload processor, then an indication of ineligibility to offload is provided. For instance, in one particular example, in interrogatory mode, the user supplies the program with a list of service calls and program call numbers supported by the offload processor. The program then checks the load module being examined and exits with a failing return code, if the load module contains any server call or program call number that is not in the supplied list. This function can be used to determine dynamically if a load module is capable of being executed on another system, which may only support a subset of service call and program call codes. In this case, if the program exits normally, it signifies that the load module contains only service call and program call instructions that are supported by the offload processor (i.e., passed in the original parameter list). Each of these examination modes is described in further detail below.

One embodiment of the report mode capability, in which work units are read and a determination is made as to the types of service call and program call instructions that are in those work units, is described with reference to FIG. 3. In this example, a work unit is a load module that was originally to be executed on a particular architecture. For example, it is a z/OS® load module that includes instructions based on the Z/ARCHITECTURE® instruction set to be executed on a Z/ARCHITECTURE®-based processor. The logic of this report mode capability is executed by, for instance, processor 102, or by another processor, which provides the results to processor 102.

Figure 3:
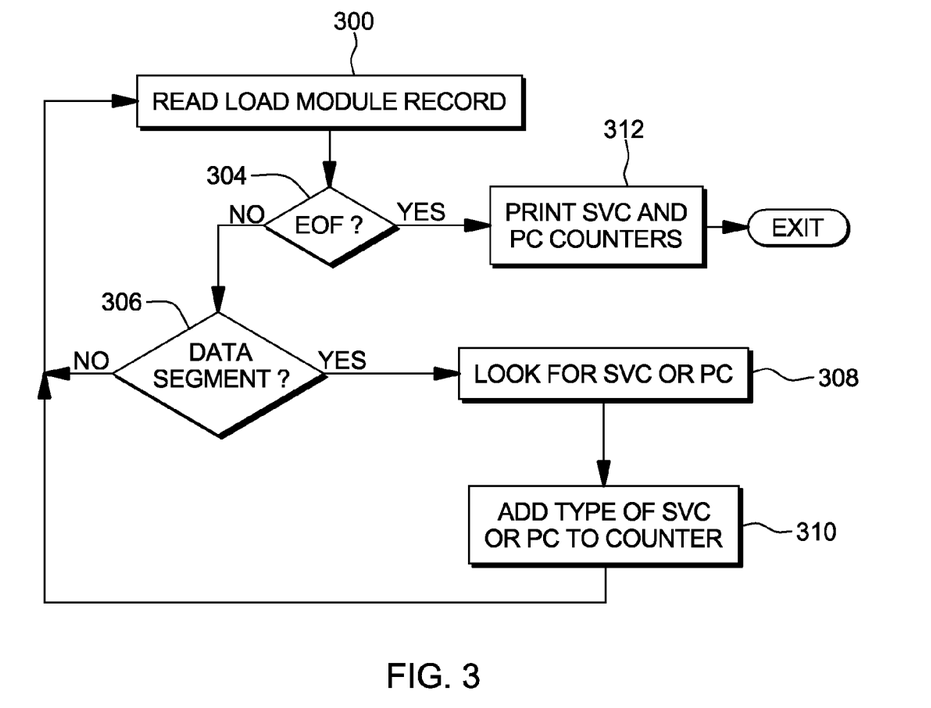
FIG. 3 depicts one embodiment of detailed logic used to determine whether a work unit, such as a load module, may be processed by an offload processor, in accordance with an aspect of the present invention.

Referring to FIG. 3, initially, a load module record is obtained and read, STEP 300. The load module may be obtained from a library of load modules that is provided to the report mode logic used to examine the load module. A determination is made as to whether the end of file has been reached, INQUIRY 304. If not, then a further determination is made as to whether there is a data segment within the load module to be examined, INQUIRY 306. If there is no data segment to be examined, then processing continues with STEP 300. Otherwise, the data of the data segment is searched for selected instructions, which include, in this example, service call type instructions or program call type instructions (e.g., the data is searched for values that indicate a service call or program call), STEP 308. For each type of service call or program call that is located, a counter for that particular type of service call or program call is incremented, STEP 310. That is, in one example, a load module may have one or more types of service calls and/or one or more types of program calls. A counter is provided for each type of service call and program call instruction that may be included in a load module. Then, when a service call or program call instruction is encountered in the load module being examined, the corresponding counter is updated.

Subsequent to updating the appropriate counter(s), processing continues with STEP 300, Read Load Module Record. If the end of file has been reached, INQUIRY 304, then a printout is provided, which includes a list of the service call and program call counters, which indicates which types of service calls and/or program calls are included in the load module being examined, STEP 312. The report that is provided may then be used to determine whether the load module is to be executed on the processor with the native architecture or on a non-native offload processor that supports all the service calls and program calls of the particular load module.

The report mode logic may be used to examine each load module in a library of load modules. Responsive to examination, one or more reports are provided that indicate for each examined load module the types of service call and/or program call instructions within that load module. Then, after the report is provided or at the time of execution of a particular load module, a determination is made as to whether this load module may be offloaded to a heterogeneous processor that may not fully support all of the service call and program call instructions of an architecture not native to the offload processor. The determination is made by comparing the instructions within the report for this load module with a list or other indication of supported non-native instructions of the offload processor. If the offload processor supports all of the instructions on the load module's report, then the load module may be offloaded for processing. Thus, an indication is provided that the load module may be offloaded (e.g., a flag observable by processor 102 is set and/or the load module is forwarded to the offload processor for execution). If the work unit is offloaded, then the selected instructions of the workload (e.g., the service call and/or program call instructions of the work unit) are emulated by the offload processor.

In another embodiment, an interactive or interrogatory mode is provided, in which it is dynamically determined whether a particular load module is to be offloaded to an offload processor. This embodiment is described with reference to FIG. 4, the logic of which is executed in one example by processor 102.

Figure 4:
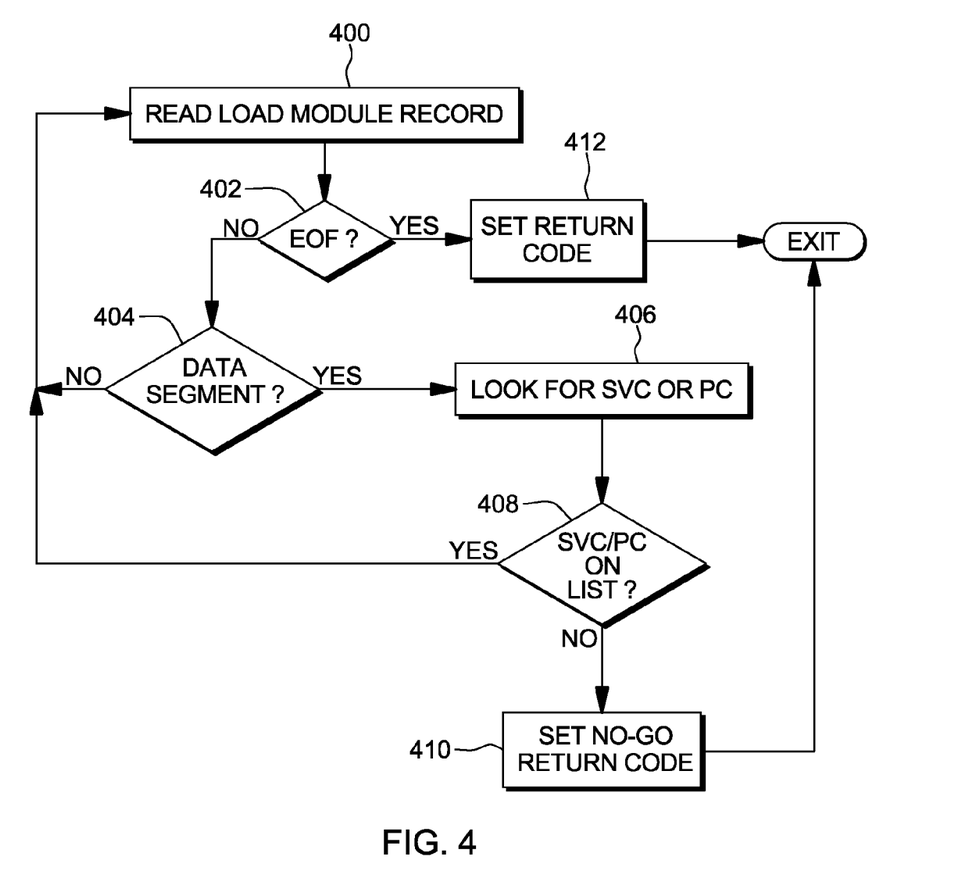
FIG. 4 depicts another embodiment of detailed logic used to determine whether a load module can be processed by an offload processor, in accordance with an aspect of the present invention.

In this example, while executing a job on processor 102, a load module of the job is encountered and read, STEP 400. A determination is made as to whether the end of file has been reached, INQUIRY 402. If not, then once again, a determination is made as to whether there is a data segment to be processed, INQUIRY 404. If not, processing continues with STEP 400. Otherwise, the data of the data segment is searched for service call or program call instructions, STEP 406. If a service call or program call instruction is found, it is compared with the service call and program calls included on an input parameter list provided to this examination logic. If the service call or program call is on the list indicating that the offload processor supports that service call or program call, INQUIRY 408, then processing continues with STEP 400. However, if a service call or program call has been encountered that is not on the list, then a return code is provided that indicates that this load module is not eligible for moving to the offload processor, STEP 410.

Returning to INQUIRY 402, if the end of file has been reached, then a return code is set indicating that all of the service calls and program calls located within the load module record are supported by the offload processor, STEP 412. Thus, in this example, processor 102 offloads the load module to the offload processor for execution. Since the offload processor is of a different architecture than the instructions of the load module, the offload processor emulates processing of the instructions.

Described in detail above is a capability for determining whether particular work units (e.g., Z/OS® load modules) are eligible for offloading to one or more heterogeneous processors. This capability enables work units to be offloaded to heterogeneous processors without requiring recompilation of the source code. Instead, a determination is made as to whether the offload processor supports selected instructions of the work unit (e.g., types of service call and program call instructions), and if so, the work unit is offloaded to the offload processor. The offload processor then emulates the processing of those instructions. One or more aspects of the present invention enables a customer's workload to be more easily analyzed for suitability for offloading to another processing facilitating that may not fully support all service call and program call codes.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electro-magnetic, optical or any suitable combination thereof. A computer readable signal medium may be any computer readable medium that is not a computer readable storage medium and that can communicate, propagate, or transport a program for use by or in connection with an instruction execution system, apparatus or device.

A computer readable storage medium may be, for example, but not limited to, an electronic, magnetic, optical, electro-magnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 5:
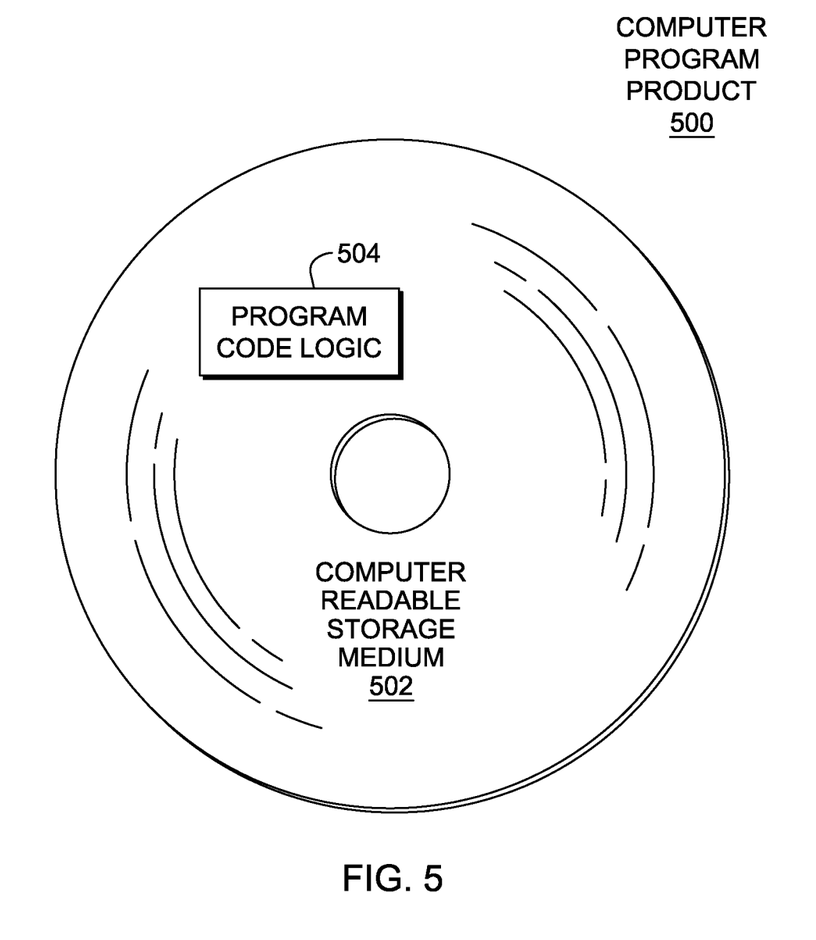
FIG. 5 depicts one embodiment of a computer program product incorporating one or more aspects of the present invention.

Referring now to FIG. 5, in one example, a computer program product 500 includes, for instance, one or more tangible, non-transitory computer readable storage media 502 to store computer readable program code means or logic 504 thereon to provide and facilitate one or more aspects of the present invention.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language, such as JAVA, Smalltalk, C++ or the like, and conventional procedural programming languages, such as the "C" programming language, assembler or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the present invention may be provided, offered, deployed, managed, serviced, etc. by a service provider who offers management of customer environments. For instance, the service provider can create, maintain, support, etc. computer code and/or a computer infrastructure that performs one or more aspects of the present invention for one or more customers. In return, the service provider may receive payment from the customer under a subscription and/or fee agreement, as examples. Additionally or alternatively, the service provider may receive payment from the sale of advertising content to one or more third parties.

In one aspect of the present invention, an application may be deployed for performing one or more aspects of the present invention. As one example, the deploying of an application comprises providing computer infrastructure operable to perform one or more aspects of the present invention.

As a further aspect of the present invention, a computing infrastructure may be deployed comprising integrating computer readable code into a computing system, in which the code in combination with the computing system is capable of performing one or more aspects of the present invention.

As yet a further aspect of the present invention, a process for integrating computing infrastructure comprising integrating computer readable code into a computer system may be provided. The computer system comprises a computer readable medium, in which the computer medium comprises one or more aspects of the present invention. The code in combination with the computer system is capable of performing one or more aspects of the present invention.

Although various embodiments are described above, these are only examples. For example, other types of servers, systems or other processing units based on the z/Architecture® may incorporate and use one or more aspects of the present invention. Similarly, other types of servers, systems or other processing units based on the x86 architecture may incorporate and use one or more aspects of the present invention. Further processing environments of other architectures and/or instruction sets can incorporate and use one or more aspects of the present invention. The z/Architecture® and the x86 architecture are just offered as examples. Many other architectures and/or instructions sets may be used.

In one example, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiment with various modifications as are suited to the particular use contemplated.

What is claimed is:

1. A computer program product for determining whether a work unit is eligible for offloading from one processor to another processor for processing, the computer program product comprising:

a non-transitory storage medium readable by a processing circuit and storing instructions for execution by the processing circuit for performing a method comprising:
examining the work unit for selected instructions, the selected instructions including at least one of one or more types of service call instructions or one or more types of program call instructions, wherein the work unit includes at least one selected instruction;
determining whether the another processor supports the at least one selected instruction existing in the work unit; and
providing an indication that the work unit is eligible for offloading, based on the determining indicating the another processor supports the at least one selected instruction, and
wherein the examining is performed prior to the work unit being provided to a work dispatcher, and
wherein the examining comprises providing one or more counts, each count of the one or more counts being for a particular type of selected instruction, and
incrementing the count for a particular type of selected instruction based on encountering the particular type of selected instruction in the work unit, and
wherein the determining comprises for at least one count of a particular type of selected instruction having a value indicating at least one instruction of that particular type of selected instruction is in the work unit comparing the particular type of selected instruction associated with that count to an indication of types of instructions supported by the another processor,
wherein the work unit is eligible for offloading based on the comparing indicating that the particular types of selected instructions in the work unit are included in the indication of types of instructions supported by the another processor.

2. The computer program product of claim 1, wherein the examining comprises creating a report, the report specifying a count of each type of selected instruction in the work unit.

3. The computer program product of claim 1, wherein the examining is dynamically performed at time of dispatching the work unit for processing, and wherein the examining comprises comparing the at least one selected instruction to a list of supported instructions of the another processor.

4. The computer program product of claim 3, wherein the providing an indication comprises setting a return code specifying that the comparing indicates that the another processor supports the at least one selected instruction.

5. The computer program product of claim 4, wherein the method further comprises dispatching the work unit to the another processor, based on the return code indicating support.

6. The computer program product of claim 1, wherein the one processor is based on one architecture and the another processor is based on another architecture different from the one architecture.

7. The computer program product of claim 1, wherein the one processor supports one instruction set and the another processor supports a different instruction set.

8. A computer system for determining whether a work unit is eligible for offloading from one processor to another processor for processing, said computer system comprising:
   a memory; and
   a processor in communications with the memory, wherein the computer system is configured to perform a method, said method comprising:
      examining the work unit for selected instructions, the selected instructions including at least one of one or more types of service call instructions or one or more types of program call instructions, wherein the work unit includes at least one selected instruction;
      determining whether the another processor supports the at least one selected instruction existing in the work unit; and
      providing an indication that the work unit is eligible for offloading, based on the determining indicating the another processor supports the at least one selected instruction, and
      wherein the examining is performed prior to the work unit being provided to a work dispatcher, and
      wherein the examining comprises providing one or more counts, each count of the one or more counts being for a particular type of selected instruction, and
      incrementing the count for a particular type of selected instruction based on encountering the particular type of selected instruction in the work unit, and
      wherein the determining comprises for at least one count of a particular type of selected instruction having a value indicating at least one instruction of that particular type of selected instruction is in the work unit comparing the particular type of selected instruction associated with that count to an indication of types of instructions supported by the another processor,
      wherein the work unit is eligible for offloading based on the comparing indicating that the particular types of selected instructions in the work unit are included in the indication of types of instructions supported by the another processor.

9. The computer system of claim 8, wherein the examining comprises creating a report, the report specifying a count of each type of selected instruction in the work unit.

10. The computer system of claim 8, wherein the examining is dynamically performed at time of dispatching the work unit for processing, and wherein the examining comprises comparing the at least one selected instruction to a list of supported instructions of the another processor.

11. The computer system of claim 10, wherein the providing an indication comprises setting a return code specifying that the comparing indicates that the another processor supports the at least one selected instruction.

12. The computer system of claim 11, wherein the method further comprises dispatching the work unit to the another processor, based on the return code indicating support.

13. A method of determining whether a work unit is eligible for offloading from one processor to another processor for processing, said method comprising:
   examining the work unit, by a processor, for selected instructions, the selected instructions including at least one of one or more types of service call instructions or one or more types of program call instructions, wherein the work unit includes at least one selected instruction;
   determining whether the another processor supports the at least one selected instruction existing in the work unit; and
   providing an indication that the work unit is eligible for offloading, based on the determining indicating the another processor supports the at least one selected instruction, and
      wherein the examining is performed prior to the work unit being provided to a work dispatcher, and
      wherein the examining comprises providing one or more counts, each count of the one or more counts being for a particular type of selected instruction, and
      incrementing the count for a particular type of selected instruction based on encountering the particular type of selected instruction in the work unit, and
      wherein the determining comprises for at least one count of a particular type of selected instruction having a value indicating at least one instruction of that particular type of selected instruction is in the work unit comparing the particular type of selected instruction associated with that count to an indication of types of instructions supported by the another processor,
      wherein the work unit is eligible for offloading based on the comparing indicating that the particular types of selected instructions in the work unit are included in the indication of types of instructions supported by the another processor.

14. The method of claim 13, wherein the examining comprises creating a report, the report specifying a count of each type of selected instruction in the work unit.

15. The method of claim 14, wherein the providing an indication comprises setting a return code specifying that the comparing indicates that the another processor supports the at least one selected instruction.

16. The method of claim 13, wherein the examining is dynamically performed at time of dispatching the work unit for processing, and wherein the examining comprises comparing the at least one selected instruction to a list of supported instructions of the another processor.

* * * * *